United States Patent [19]

van Berkel et al.

[11] Patent Number: 6,064,424

[45] Date of Patent: May 16, 2000

[54] AUTOSTEREOSCOPIC DISPLAY APPARATUS

[75] Inventors: Cornelis van Berkel, Hove; John A. Clarke, Carshalton, both of United Kingdom

[73] Assignee: U.S. Philips Corporation, New York, N.Y.

[21] Appl. No.: 08/798,678

[22] Filed: Feb. 12, 1997

[30] Foreign Application Priority Data

Feb. 23, 1996 [GB] United Kingdom ............... 9603890
Oct. 24, 1996 [GB] United Kingdom ............... 9622157

[51] Int. Cl.$^7$ ................................................. H04N 13/00
[52] U.S. Cl. .................................. 348/51; 348/42
[58] Field of Search .................... 348/42, 51, 59; 350/330, 167; 345/32; H04N 13/00

[56] References Cited

U.S. PATENT DOCUMENTS 3,409,351  11/1968  Winnek ......................................... 353/7
5,546,120  8/1996   Miller .......................................... 348/59
5,774,261  6/1998   Omori et al. ............................... 348/51

FOREIGN PATENT DOCUMENTS

0625861A2  11/1994  European Pat. Off. .
2196166    4/1988   United Kingdom .

Primary Examiner—Vu Le
Assistant Examiner—Luanne P. Din
Attorney, Agent, or Firm—John C. Fox

[57] ABSTRACT

An autostereoscopic display apparatus comprises means (10) for producing a display consisting of display pixels (12) in rows and columns, for example, an LC matrix display panel having a row and column array of display elements, and an array (15) of parallel lenticular elements (16) overlying the display, in which the lenticular elements are slanted with respect to the display pixel columns. The reduction in display resolution experienced in such apparatus, particularly in the case of a multi-view type display, is then shared between both horizontal and vertical resolution. Examples of full colour display apparatus using advantageous colour display pixel lay-out schemes are also described.

20 Claims, 5 Drawing Sheets

AUTOSTEREOSCOPIC DISPLAY APPARATUS

BACKGROUND OF THE INVENTION

The present invention relates to an autostereoscopic display apparatus comprising means for producing a display which comprises an array of display pixels arranged in rows and columns, and an array of elongate lenticular elements extending parallel to one another overlying the display pixel array and through which the display pixels are viewed.

Examples of such autostereoscopic display apparatus are described in the paper entitled "Multiview 3D-LCD" by C. van Berkel et al in SPIE Proceedings, Vol. 2653, 1996, pages 32–39, and in GB-A-2196166. In these apparatus, a matrix display device comprising a LC (liquid crystal) display panel having a row and column array of display elements and acting as a spatial light modulator produces the display. The lenticular elements are provided by a lenticular sheet, whose lenticules, comprising elongate (semi) cylindrical lens elements, extend in the column direction of the display panel, parallel to the display element columns, with each lenticule overlying a respective group of two, or more, adjacent columns of display elements. Commonly in such apparatus, the LC matrix display panel is of a conventional form, comprising regularly spaced rows and columns of display elements, as used in other types of display applications, e.g. computer display screens. In EP-A-0625861, further examples of autostereoscopic display apparatus are described which use LC matrix display panels having non-standard display element lay-outs in which adjacent display elements are arranged in groups with the display elements in a group being arranged so as to be substantially contiguous with one another in the row direction. There is also described in this specification an example of a projection apparatus using such panels in which an image of the display element array is projected magnified onto a screen and in which the lenticular sheet is associated with the screen.

Considering a direct-view type of apparatus, then the display pixels forming the display are constituted by the display elements of the display panel. In an arrangement in which, for example, each lenticule is associated with two columns of display elements, the display elements in each column provide a vertical slice of a respective 2D (sub-) image. The lenticular sheet directs these two slices and corresponding slices from the display element columns associated with the other lenticules, to the left and right eyes respectively of a viewer in front of the sheet so that the viewer perceives a single stereoscopic image. In other, multi-view, arrangements in which each lenticule is associated with a group of four or more adjacent display elements in the row direction and in which corresponding columns of display elements in each group are arranged appropriately to provide a vertical slice from a respective 2-D (sub-) image, then as a viewer's head is moved a series of successive, different, stereoscopic views are perceived creating, for example, a look-around impression. Similar stereoscopic effects are obtained with a projection apparatus except that in this case the display pixels forming the display, on the screen, are constituted by projected images of the display elements.

The use of a matrix display panel in conjunction with a lenticular screen whose lenticules extend parallel to the display element columns provides a simple and effective way of achieving a 3-D display. However, for a standard type of display panel having a given number of display elements in a row then in order to provide a plurality of views in the 3D display, horizontal display resolution is necessarily sacrificed. For example, with a display panel having an array of 800 columns and 600 rows of display elements (each of which display elements may comprise a colour triplet if a full colour display is required) then for a four view system providing three stereo pairs at a fixed viewing distance the resulting display would have a resolution of only 200 in the horizontal, row, direction and 600 in the vertical, column, direction for each view. Thus, the stereoscopic images as seen by the viewer each have a comparatively high vertical resolution but only a comparatively small horizontal resolution. The substantial difference between vertical and horizontal resolution capabilities is, of course, undesirable.

OBJECTS AND SUMMARY OF THE INVENTION

It is an object of the present invention to provide an improved autostereoscopic display apparatus.

According to the present invention, there is provided an autostereoscopic display apparatus of the kind described in the opening paragraph which is characterised in that the lenticular elements are slanted at an angle to the display pixel columns. With this arrangement, the number of views to be obtained need not involve a trade-off against horizontal resolution capability alone. Through slanting the lenticular elements some of the reduction in horizontal resolution which would otherwise be required is transferred to the vertical resolution and it becomes possible to use both vertical and horizontal resolution to increase the number of views displayed with the penalty for obtaining a plurality of views shared between the horizontal and vertical resolution rather than being borne solely by the horizontal resolution. Thus, compared with the known examples of apparatus using a conventional type of display panel, having a standard row and column display element lay out and lenticular elements extending parallel to the columns, which results in the number of views obtained being limited if adequate horizontal resolution is maintained, the extent of reduction in horizontal resolution needed in order to provide a certain number of views is reduced at the expense of some vertical resolution.

The apparatus may be a direct view type of a display apparatus or an image projection type of display apparatus in which a magnified image is projected onto a display screen by means of a projection lens. In a preferred embodiment, the means for producing the display comprises a matrix display panel, preferably a liquid crystal matrix display panel having a row and column array of display elements, each of which provides a display pixel. In a direct view apparatus, the display pixels forming the display to be viewed are thus constituted by the display elements of the panel and in this case the array of lenticular elements is disposed over the output side of the display panel. In a projection display apparatus, the display pixels forming the display to be viewed comprise projected images of the display elements of the matrix display panel and the array of lenticular elements is in this case disposed over the viewing side of the display screen. In a projection apparatus, the display pixels may alternatively comprise a projected image from another kind of display device, for example, a CRT.

An important advantage of the invention is that it allows a conventional form of LC matrix display panel, having regularly spaced, aligned, rows and columns of display elements, to be used. In particular, changes to the display element lay-out are not required. In EP-A-0625861 an example apparatus is described in which the number of 2D views for a 3D frame is increased at the expense of vertical resolution but this is achieved using a display panel in which adjacent display elements in a group are staggered vertically, i.e. in the column direction. The display element lay-out is thus unusual and consequently standard kinds of display panels, as used in other applications, could not be utilised. Moreover, the manner of the display element lay-out results in less efficient use of the panel area with less light throughput.

A further important advantage of the invention is that the extent of unwanted display artefacts due to the presence of black matrix materials extending in gaps between the display elements in the matrix display panel is reduced. Such black matrix material bordering the display elements is used in LC display panels to enhance contrast and also, in the case of active matrix type panels, to shield the switch elements, e.g. TFTs. Because it extends vertically between adjacent columns of display elements, this material is imaged by the lenticular screen in a conventional arrangement which a viewer perceives as black bands between adjacent 2D views. In the arrangement of the invention then because the lenticular elements do not extend parallel to the columns of display elements, and hence parallel to the vertical strips of black matrix material between the columns, the visibility of the black mask in the perceived display is reduced.

Although the matrix display panel preferably comprises an LC display panel, it is envisaged that other kinds of display panels could be used, for example electroluminescent or gas plasma display panels.

Preferably, the lenticular elements are slanted with respect to the columns of display pixels so as to create repeating groups of display pixels each of which groups is constituted by adjacent display pixels in r adjacent rows where r is a number greater than one. In a particularly preferred embodiment, r is equal to 2. The extent of overlap between views is then minimised. The angle of slant of the lenticular elements may be substantially equal to $\tan^{-1}(H_p/(V_p.r))$ where $H_p$ and $V_p$ are the pitch of the display pixels in the row and column directions respectively.

The pitch of the lenticular elements need not correspond to a whole number of display pixels in the row direction. The pitch of the lenticular elements should preferably be at least 1½ times the pitch of the display pixels in the row direction in order to obtain three or more views. In particularly preferred embodiments, the pitch of the lenticular elements is equal to 2½ or 3½ times the pitch of the display pixels in the row direction, providing a five view and a seven view system respectively. In these, a better balance between horizontal and vertical resolution is achieved while reasonable numbers of views are obtained.

The lenticular elements may have a cross-section which comprises part of a circle. Such lenticular elements are easy to produce. Alternative forms of lenticular elements could be used. For example, the lenticular elements could be formed of contiguous straight line portions.

The autostereoscopic display apparatus can be a colour display apparatus in which different display pixels provide different colours. In the case of an LC matrix display panel, for example, a colour display is normally achieved by means of an array of colour, red, green and blue, filters overlying and aligned with the array of display elements. Typically, the colour filters are arranged as strips extending parallel to the display element columns so that three adjacent columns of display elements are associated with red, green and blue filters respectively, the pattern being repeated across the array so that every third column displays the same colour, for example, red. However, the use of such a colour pixel lay-out can give rise to undesirable display artefacts, in the form of visible horizontal or diagonal colour stripes. Preferably, therefore, in order to reduce the visibility of such stripes, the colour pixels are arranged so as to produce colour pixel triplets, each comprising a red, green and blue display pixel, having a delta configuration. In one preferred embodiment of the colour display apparatus using a colour matrix display panel, all the display pixels in a row are arranged to display the same colour and three adjacent rows of display pixels each display a respective one of the colours red, green and blue. Thus, for example, successive rows of pixels display red, green, blue, red, green, blue, etc. As a result, the aforementioned problems with visible colour stripes are reduced. In an LC colour display panel, this is achieved simply by arranging the colour filters in strips extending in the row direction rather than the column direction as usual.

In another preferred embodiment of the colour display apparatus, using a colour matrix display panel, the display pixels underlying a respective lenticular element are all of the same colour and the display pixels underlying each of three adjacent lenticular elements are arranged to display a respective one of the colours red, green and blue. Thus, for example, each row of display pixels comprises successive groups of red, green and blue display pixels, the display pixels in each group underlying a respective lenticular element. Because of the slant of the lenticular elements with respect to the pixel columns, the groups of colour display pixels in certain rows, for example every third row, are offset in the row direction with respective to the groups in an adjacent row. This kind of colour pixel lay-out offers two further advantages. Firstly, colour triplets, each comprised of a red, a green and a blue display pixel, in adjacent views are made to interlock so that at positions where, due to cross-talk, the eye sees two views simultaneously, the colour triplet pitch is in effect halved. Secondly, implementations of the colour filter arrangements in an LC matrix display panel are such that display elements of the same colour are grouped together and this grouping allows a relaxation in the necessary alignment accuracy between the black mask and the colour filter array, which improves manufacturing yield, without decreasing the display element aperture.

BRIEF DESCRIPTION OF THE DRAWINGS

Embodiments of autostereoscopic display apparatus in accordance with the invention will now be described, by way of example, with reference to the accompanying drawings, in which.

Figure 1:
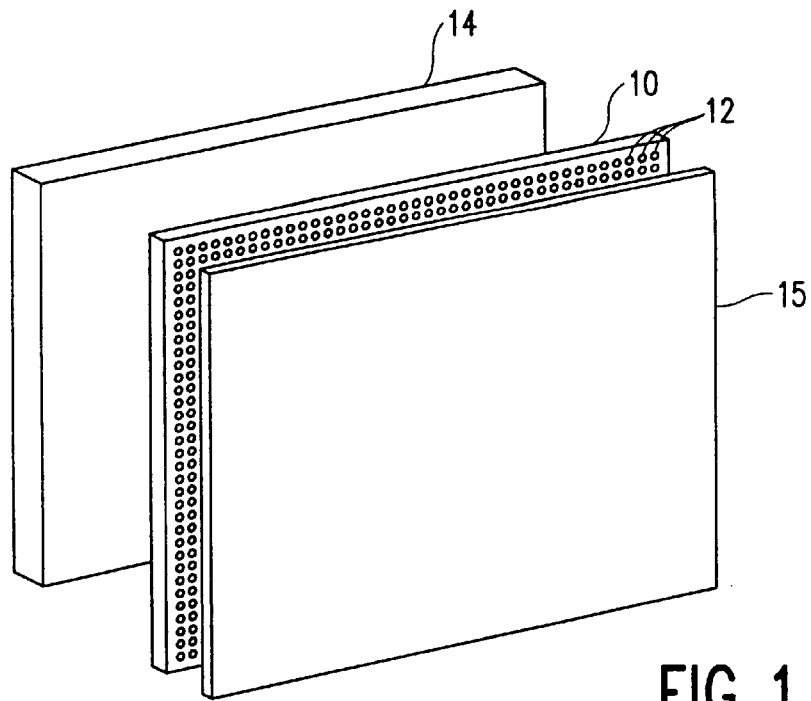
FIG. 1 is a schematic perspective view of an embodiment of autostereoscopic display apparatus according to the invention using a matrix display panel.

It should be understood that the Figures are merely schematic and are not drawn to scale. In particular, certain dimensions may have been exaggerated whilst other dimensions may have been reduced. It should also be understood that the same reference numerals are used throughout the Figures to indicate the same or similar parts.

DESCRIPTION OF THE PREFERRED EMBODIMENTS

Referring to FIG. 1, the apparatus, which in this embodiment is a direct-view type, includes a conventional LC matrix display panel 10 used as a spatial light modulator and comprising a planar array of individually addressable, and similarly sized, display elements 12 arranged in aligned rows and columns perpendicularly to one another. The display elements are shown schematically with only a comparatively few in each row and column. In practice, however, there may be around 800 columns (or 2400 columns if colour, R,G,B triplets are used to provide a full colour display) and 600 rows of display elements. Such panels are well known and will not be described here in detail. Briefly, however, the LC panel has two spaced transparent plates, for example of glass, between which twisted nematic or other LC material is disposed, and which carry on their facing surfaces patterns of transparent electrodes, e.g. of ITO, that determine the lay-out and shape of the display elements, each element comprising opposing electrodes on the two plates with intervening LC material. Polarising layers are provided on the outer surfaces of the plates as usual. The display elements 12 are substantially rectangular in shape and are regularly spaced from one another with the display elements in two adjacent columns being separated by a gap extending in column, vertical, direction and with the display elements in two adjacent rows being separated by a gap extending in the row, horizontal, direction. Preferably, the panel 10 is of the active matrix type in which each display element is associated with a switching element, comprising for, example, a TFT or a thin film diode, TFD, situated adjacent the display element. To accommodate these devices, the display elements may not be completely rectangular. As is usual, the gaps between the display elements are covered by a black mask comprising a matrix of light absorbing material carried on one, or both, plates which separates the display elements.

The display panel 10 is illuminated by a light source 14, which in this example comprises a planar back-light extending over the area of the display element array. Other kinds of light source could alternatively be used. Light from the light source 14 is directed through the panel with the individual display elements being driven, by appropriate application of drive voltages, to modulate this light in conventional manner to produce a display output. The array of display pixels constituting the display produced thus corresponds to the display element array, each display element providing a respective display pixel.

Over the output side of the panel 10 there is disposed a lenticular sheet 15 which extends substantially parallel to the plane of the display panel and which comprises an array of elongate, parallel, lenticular elements, i.e. lenticules, acting as optical director means to provide separate images to a viewer's eyes, for producing a stereoscopic display to a viewer facing the side of the sheet 15 remote from the panel 10. The lenticules of the sheet 15 comprise optically cylindrically converging lenticules, for example formed as convex cylindrical lenses or graded refractive index cylindrical lenses. Autostereoscopic display apparatus using lenticular sheets in conjunction with matrix display panels are well known and it is not thought necessary to describe here in detail the manner of their operation. Examples of such apparatus and their operation in producing stereoscopic images are described in the aforementioned paper by C. van Berkel et al, in GB-A-2196166 and in EP-A-0625 861 whose disclosures in this respect are incorporated herein by reference. Preferably, the lenticular array is provided directly on the outer surface of the output side plate of the panel 10. Unlike the lenticules in the known arrangements, which extend parallel to the display pixel columns (corresponding to the display element columns), the lenticules in the apparatus of FIG. 1 are arranged slanted with respect to the columns of display pixels, that is, their main longitudinal axis is at an angle to the column direction of the display element array.

Figure 2:
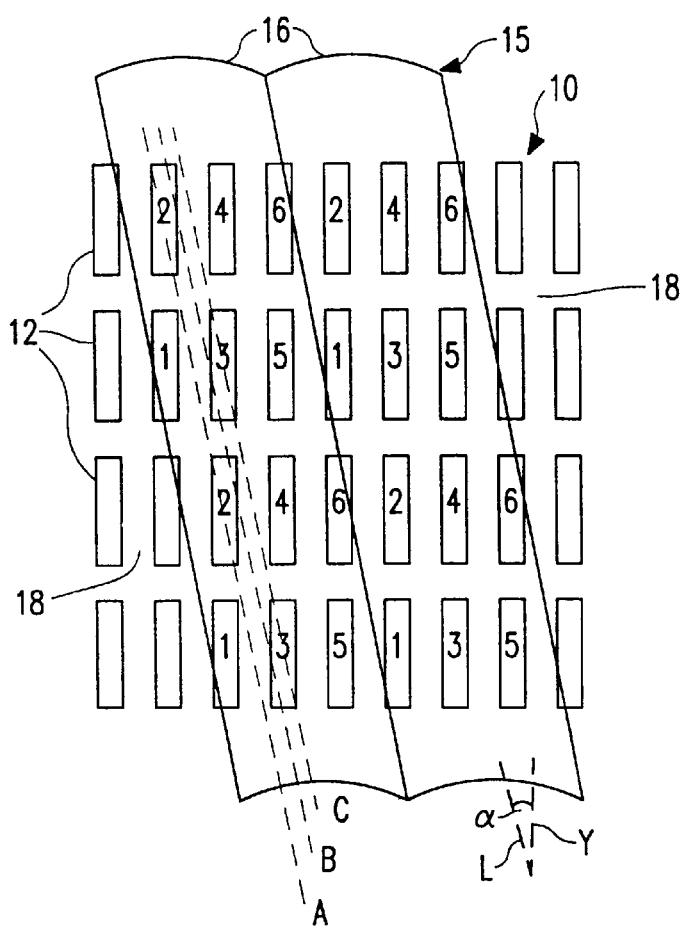
FIG. 2 is a schematical plan view of a typical part of the display element array of the display panel illustrating an example arrangement of the lenticular elements in relation to the display elements for providing a six view output.

The pitch of the lenticules is chosen in relation to the pitch of the display elements in the horizontal direction according to the number of views required, as will be described, and each lenticule, apart from those at the sides of the display element array, extends from top to bottom of the display element array. FIG. 2 illustrates an example arrangement of the lenticules, 16, in combination with the display panel for a typical part of the display panel. The longitudinal axis L of the lenticules, 16, is slanted at an angle α to the column direction, Y. In this example, the longitudinal axes of the parallel lenticules are of such a width with respect to the pitch of the display elements in a row and are slanted at such an angle with respect to the columns of display elements as to provide a six view system. The display elements 12 are again indicated by simple rectangles, representing the effective aperture of the display elements and thus the display pixels, and the regions between the display elements are covered by the black mask material 18 in a grid pattern. The size of the gaps between adjacent display elements shown in FIG. 1 is shown greatly exaggerated. The display elements 12 are numbered (1 to 6) according to the view-number to which they belong. The individual, and substantially identical, lenticules 16 of the lenticular sheet 15 each have a width which corresponds approximately to three adjacent display elements in a row, i.e. the width of three display elements and their intervening gaps. Display elements of the six views are thus situated in groups comprising display elements from two adjacent rows, three in each row.

The individually operable display elements are driven by the application of display information in appropriate manner such that a narrow slice of a 2D image is displayed by selected display elements under an associated lenticule. The display produced by the panel comprises six interleaved 2D sub-images constituted by the outputs from respective display elements. Each lenticule 16 provides six output beams from the associated underlying display elements with view-numbers 1 to 6 respectively whose optical axes are in mutually different directions and angularly spread around the longitudinal axis of the lenticule. With the appropriate 2D image information applied to the display elements and with a viewer's eyes being at the appropriate distance to receive different ones of the output beams then a 3D image is perceived. As the viewer's head moves in the row direction then five stereoscopic images can be viewed in succession. Thus, a viewer's two eyes would see respectively, for example, an image composed of all display elements "1" and an image composed of all display elements "2". As a viewer's head moves, images comprised of all display elements "2" and all display elements "3" will be seen by respective eyes, then images comprised of all display elements "3" and all display elements "4", and so on. At another viewing distance, closer to the panel, the viewer may, for example, see views "1" and "2" together with one eye and views "3" and "4" together with the other eye.

The plane of the display elements 12 coincides with the focal plane of the lenticules 16, the lenticules being suitably designed and spaced for this purpose, and consequently position within the display element plane corresponds to viewing angle. Hence all points on the dashed line A in FIG. 2 are seen simultaneously by a viewer under one specific horizontal (row direction) viewing angle, as are all points on the dashed line B in FIG. 2 from a different viewing angle. Line A represents a monocular viewing position in which only display elements from view "2" can be seen. Line B represents a monocular viewing position in which display elements from both view "2" and view "3" can be seen together. Line C in turn represents a position in which only display elements from view "3" can be seen. Thus, as the viewer's head moves, with one eye closed, from the position corresponding to line A to line B and then line C a gradual change-over from view "2" to view "3" is experienced. When the viewer's eye moves, therefore, the image perceived does not flip or jump abruptly to the next but instead at a transition between the two images a merging effect occurs to give a smoother transition. Provided the autostereoscopic display contains enough views this effect will enhance the perception on the display of "solid" objects rather than merely a collection of "flipping" views. To the viewer, the gradual change in successive views experienced gives the impression of enhanced continuous parallax. The change-over from one view to another is dependent on the actual display element lay-out and the aperture ratio between open display element area and the black mask area. Because the lenticules 16 are spaced from the plane of the display elements 12 then the whole of the underlying display elements will be visible through the lenticule even though some of the display elements, such as those constituting view 6, appear to lie on the border between two lenticules.

With this slanting lenticule arrangement, therefore, it is seen that a number of different views are obtainable but not solely at the expense of horizontal resolution as in the known apparatus in which the lenticules extend parallel to the display element columns. Instead the inevitable reduction in resolution is shared more evenly between both horizontal and vertical resolution. In the six view arrangement of FIG. 2, for example, producing a monochrome display output horizontal resolution is reduced by a factor of three and the vertical resolution is halved. With a conventional apparatus, then a six view system would reduce horizontal resolution by a factor of six while vertical resolution would be unaffected. This advantage is achieved without resorting to a customised display panel having an unusual display element formation and the display panel 10 can be a standard type used for other, ordinary viewing, display applications, such as display screens for notebook computers and the like, and available off-the-shelf.

An additional advantage of this arrangement is that because the lenticules do not extend parallel to the continuous vertical strips of black mask material 18 between adjacent columns of display elements, the visibility of these strips to a viewer is reduced and the kind of problems experienced with conventional apparatus, in which such strips are imaged by the lenticules to appear as black bands separating successive different views as a viewer's head moves, are avoided.

The slanting lenticule arrangement can be applied to both monochrome and colour displays. Considering, for example, the six-view scheme of FIG. 2 applied to an LC display panel in which a colour microfilter array is associated with the display element array and arranged with the colour filters running in horizontal R-G-B column triplets (i.e. with three successive columns of display elements displaying red, green and blue respectively), then if the view "1" display elements in the second row are red, then the view "1" display elements of the fourth row will be green. A similar situation occurs for the other views. Hence each view will have coloured rows which means that for a colour display the vertical resolution is one third of that of a monochrome display.

In an example embodiment of the apparatus a colour LC display panel having a resolution of 2400 display elements (800×3 colour triplets) horizontally and 600 display elements vertically was used. The horizontal triplet pitch was 288 $\mu$m (96 $\mu$m per display element) and the display element vertical pitch was 288 $\mu$m. The width and slant angle of the lenticules 16 are determined by the size and pitch of the display elements and the number of views required. For a six-view scheme as shown in FIG. 2, the slant angle, $\alpha$, of the lenticules, that is the angle between the longitudinal axis of the lenticule and the vertical, is given by $\alpha=\tan^{-1}$ (96/(2×288)=9.46°. Normally, the lenticular lens magnification would be determined by the requirement that the display elements corresponding to adjacent views are projected into the left and right eyes of the viewer. Assuming an intraocular distance of 65 mm, the magnification, m, then required would be 1354. However, there is a minimum separation distance, L, between the lenticules and the display elements which is determined by the thickness, t, of the glass plate (including the polarising layer) of the panel. Assuming this distance is around 1.5 mm and that the refractive index, n, of the glass plate is 1.52 then the working distance D, that is the distance of a viewer's eyes from the lenticular sheet and given by m.t/n, would be around 1.34 m which is undesirably large. For this reason, a requirement that only the next nearest neighbour views be magnified to the interocular distance was chosen consequently halving the magnification from 1354 to 677. Through this, the working distance D was reduced to 67 cm. The pitch $\mu_p$ of the lenticules perpendicular to their longitudinal axis, i.e. the pitch at which the mould has to be cut, works out at $\mu_p$=283.66 $\mu$m. The lens focal length, f, (given by D/(m+1)) is then 0.99 mm and its radius of curvature, R, given (in the paraxial approximation) by R=f. (n−1) becomes 0.48 mm, using a refractive index value of 1.483.

The resolution obtained for each view in this six-view scheme using an 800 (triplet) by 600 display element array is 800 horizontal and 100 vertical. This compares with a resolution of 133 horizontal and 600 vertical per view obtained in a conventional arrangement using the same display panel together with lenticules extending parallel to the display element columns.

In another example embodiment, providing an 8-view system, and using the same display panel, the lenticules are slanted at the same angle as before (i.e. 9.46°) but have a 33⅓% larger pitch and cover four display elements on each row. Display elements of the 8 views are thus situated in groups comprising display elements from two adjacent rows, four in each row. Each lenticule 16 in this case provides eight output beams from the underlying display elements whose optical axes are in mutually different directions and angularly spread around the longitudinal axis of the lenticule. The resolution for each view obtained in this 8 view arrangement is then 400 horizontal and 150 vertical, compared with 100 horizontal and 600 vertical in the conventional apparatus.

Figure 3:
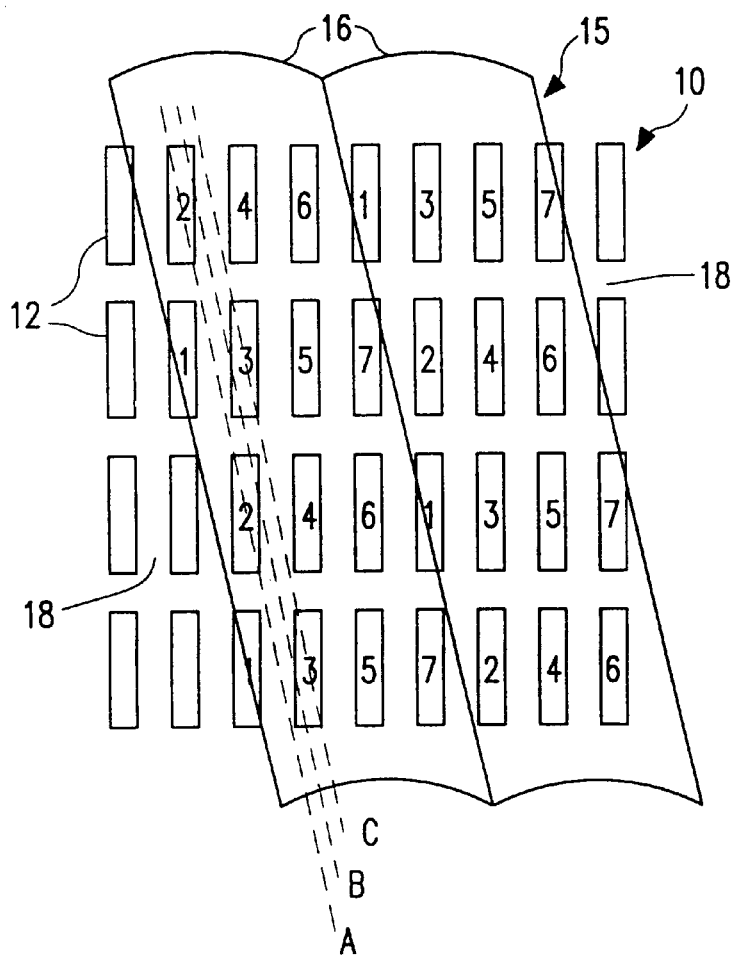
FIG. 3 is similar to FIG. 2 but illustrates an arrangement of the lenticular elements in relation to the display elements for providing a seven view output.

While in the 6 and 8 view arrangements the horizontal resolution is increased considerably, the vertical resolution is rather poor. This situation can be significantly improved, however, in the following way. Each lenticule need not overlie and cooperate optically with a whole number of adjacent display elements in a row. In further, preferred, embodiments, again using the same display panel, the lenticules are designed such that, rather than covering 3 or 4 display elements on each row as in the above-described arrangements, they instead cover 2½ or 3½ display elements, that is, the pitch of the lenticular elements corresponds to 2½ and 3½ times the pitch of the display elements in the row direction, to provide a 5-view and a 7-view system respectively. In these, the output beams, 5 or 7, provided by each lenticule from the underlying display elements have optical axes which are in mutually different directions and spread angularly around the longitudinal axis of the lenticule. The arrangement for the seven view system is shown in FIG. 3. As before, the display elements are numbered according to the view number to which they belong and the dashed lines A, B and C indicate simultaneously-viewed points for respective different horizontal viewing angles. As can be seen, the view numbers under each lenticule 16 are not repeated along the display row (as was the case in the FIG. 2 arrangement) but are offset by one row between adjacent lenticules. This kind of arrangement provides an improved balance between resulting horizontal and vertical resolution. This principle could be extended to lenticules covering, for example, 2⅓ or 2¼ display elements and down to a minimum of 1½ display elements, providing 3 views.

Using again an 800 by 600 display panel with the display elements arrayed in aligned row and columns, the resolution obtained per view in the five and seven view schemes described above would be 480 by 200, and 342 by 200 respectively. These compare with 160 by 600, and 114 by 600, respectively using the same panel but with the lenticules arranged conventionally in parallel with the columns. Thus, a significant improvement in horizontal resolution is achieved while still maintaining reasonably high vertical resolution.

In all the above examples, the slant angle, α, of the lenticules is the same namely 9.46°, and the number of display element rows, r, utilised in each group of display elements is two. The slant angle can, however, be varied. This angle is determined by the expression $\alpha = \arctan((H_p/(V_p \cdot r)))$ where $V_p$ and $H_p$ are respectively the vertical pitch and horizontal pitch of the display elements in the display panel. Assuming their values are as described earlier, then for r equal to 3 or 4 the slant angle α becomes 6.34° and 4.76° respectively. However, as the slant angle decreases the overlap between the views increases.

Colour LC display panels for datagraphic display applications commonly use a colour pixel lay-out in which each colour pixel comprises three (red, R, green, G, and blue, B) adjacent (sub-)pixels in a row constituting a horizontal RGB triplet. Such a colour pixel layout is formed using vertical colour filter stripes such that the display elements of the panel are arranged in respective, R, G and B, columns in repeating fashion. When using a slanted lenticule arrangement with a colour display in which the pixels are arranged in colour triplets in this manner, the layout of the colour pixel triplets that the eye perceives in each view can be such that the pixel pitch in one direction, for example horizontally, is much larger than the pixel pitch in the perpendicular, i.e. vertical, direction and this can give rise to visible colour stripes running, in the case for example of the 5 or 7 view system, diagonally, or in the case for example of the 6 view system, horizontally across the display.

Figure 4A:
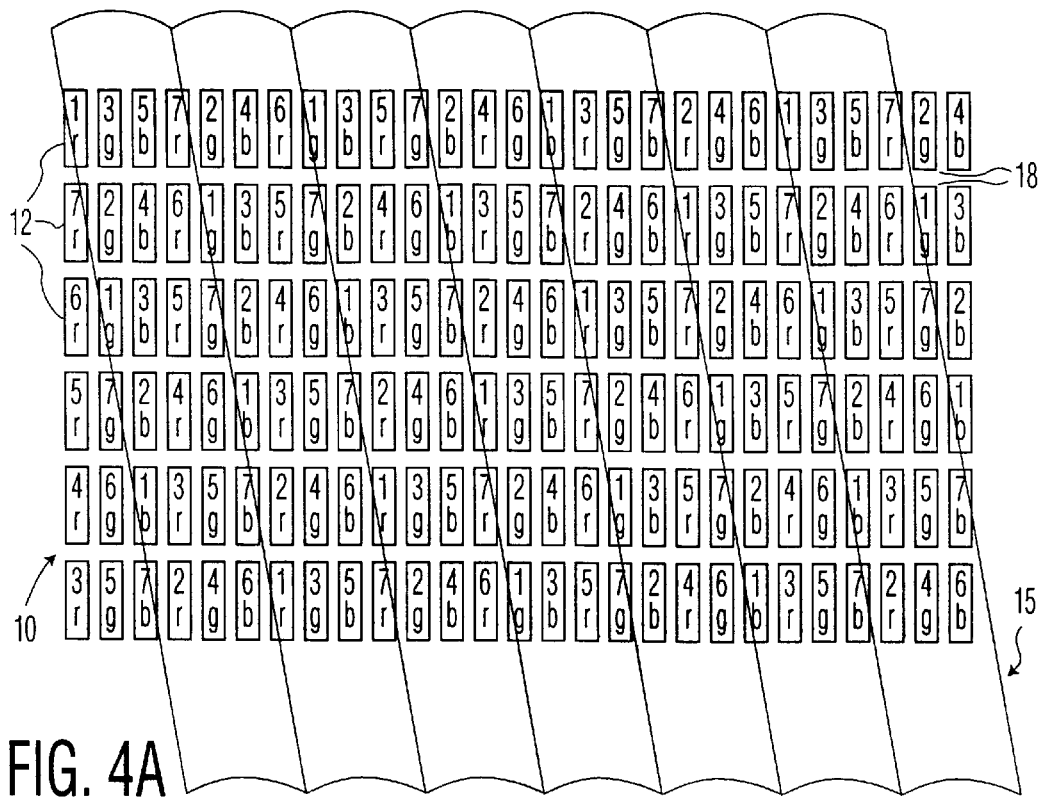
FIG. 4A is a plan view schematically illustrating the relationship between display elements and lenticular elements for a part of the display element array in an embodiment of the apparatus for producing a full colour, seven view display output.

FIG. 4A illustrates a 7-view system, similar to that of FIG. 3, using this common type of colour LC display panel in which the display (sub-)elements 12, and hence display pixels, are arranged in columns of a respective colour. As before, the slanted lines indicate the boundaries between adjacent lenticules, 16. Individual pixels, represented as rectangles, are arranged on a square grid in horizontal triplets, each such square triplet comprising three adjacent, red, r, green, g, and blue, b, (sub-)pixels constituting a full colour pixel. The numbers (1 to 7) and the letters r, g, b denote the view number and colour for each pixel. The array of lenticules is located approximately 1.5 mm above the plane of the LC cell. Assuming, by way of example, an SVGA, 11.4 inch LC colour display panel is used, the horizontal pixel pitch will be approximately 96 μm and the vertical pitch will be approximately 288 μm.

Figure 4B:
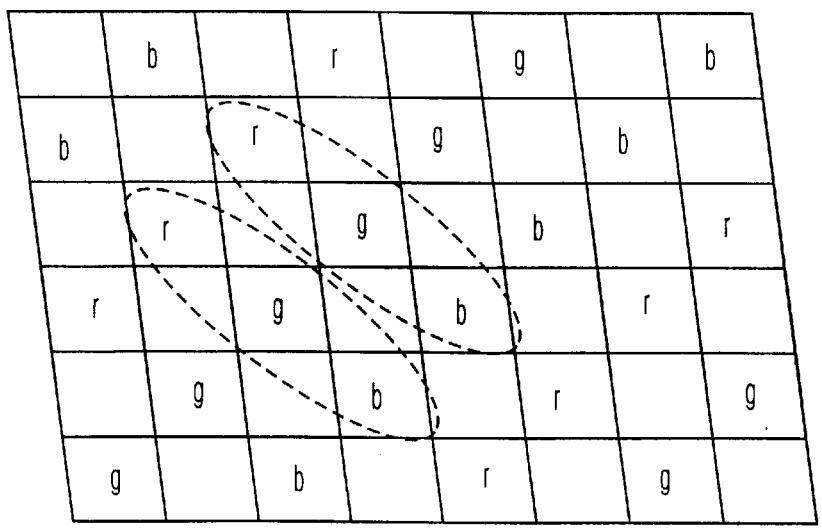
FIG. 4B shows the colour pixels seen by one eye of a viewer in the embodiment of FIG. 4A when in a position corresponding to a particular view.
Figure 4C:
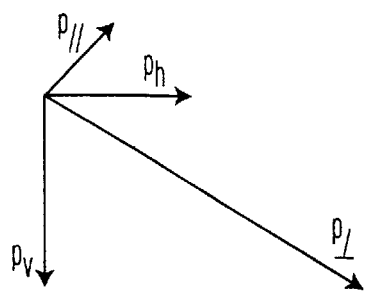
FIG. 4C is a vector diagram showing various colour pixel pitches perceived by the eye present in the arrangement of FIGS. 4A and 4B.

FIG. 4B illustrates what one eye of a viewer would see with this arrangement in a position corresponding to, for example, view 4, for a typical part of the display. From this position, the pixels marked "4" in FIG. 4A appear to fill the whole of their respective overlying lenticule 16 and the lenticule portions lying over groups of pixels for the even number (0, 2, 4, 6) views appear black or dim. As is apparent from FIG. 4B, the sub-pixels in view "4" are arranged in full colour pixels each comprising a triplet of three adjacent, differently-coloured, sub-pixels which run diagonally across the screen, two such triplets being indicated by the dashed lines. FIG. 4C is a vector diagram showing various pitches as presented to the eye in this case. The colour pixel (triplet) pitch perpendicular to the colour filter stripes, indicated at P ⊥ in FIG. 4C, is 1440 μm and the colour pixel pitch parallel to the colour stripes, P ∥ in FIG. 4C, is 403 μm. The colour pixel pitches $P_h$ and $P_v$ in the horizontal and vertical directions are 672 μm and 864 μm respectively, giving a reasonable pixel count of 343×200 in each view. The appearance of the display is, however, dominated by the comparatively large pitch P⊥, or, on the other hand, a comparatively small pitch P ∥ it being noted that the product of $P_v$ and $P_h$ is equal to the product of P ⊥ and P ∥. This pitch distinction manifests itself as diagonally extending colour stripes. A similar effect appears in, for example, a five view system while for a six view system the comparatively large perpendicular pitch manifests itself as horizontally running colour stripes.

The problem can be avoided by re-arranging the colour filters, and thus the colour sub-pixel lay-out. Examples of apparatus with suitably re-arranged colour filters will now be described in relation to, again, a seven-view system embodiment as described above. It will be appreciated, however, that the principles are similarly applicable to the embodiments providing a different number of views.

Figure 5A:
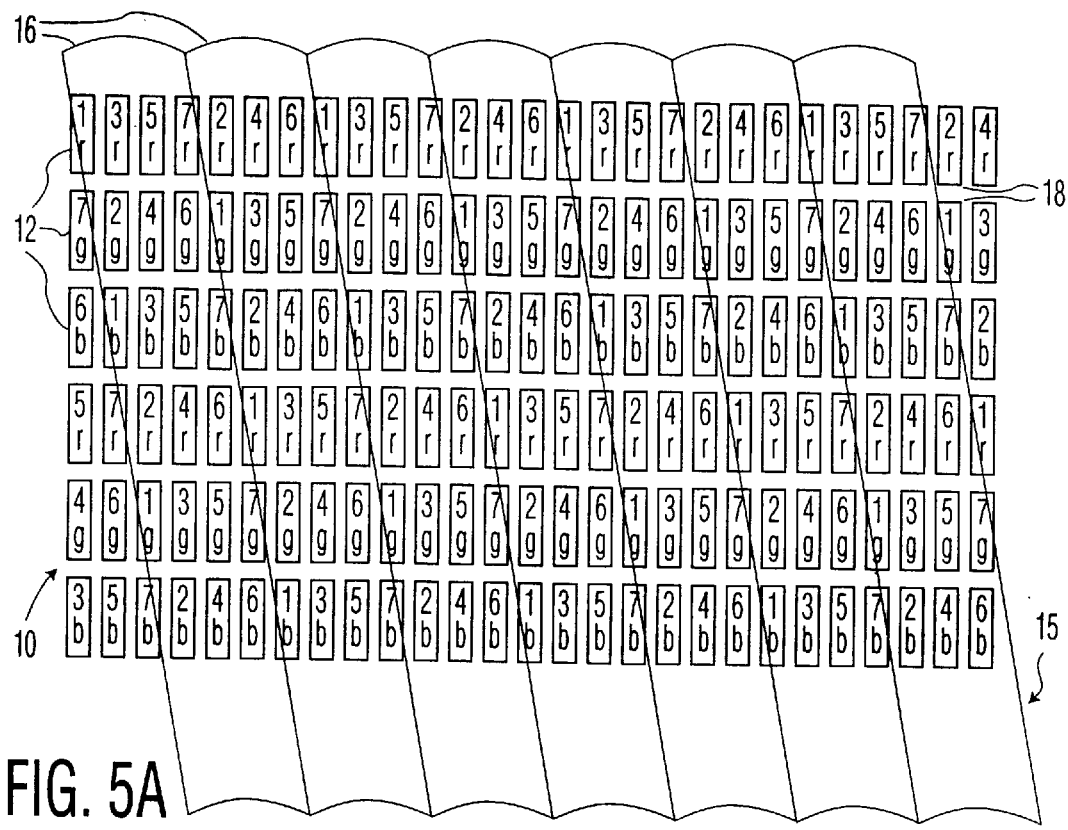
FIG. 5A illustrates the relationship between display elements and lenticular elements, in similar manner to that of FIG. 4A, in another embodiment of a full colour display apparatus.
Figure 5B:
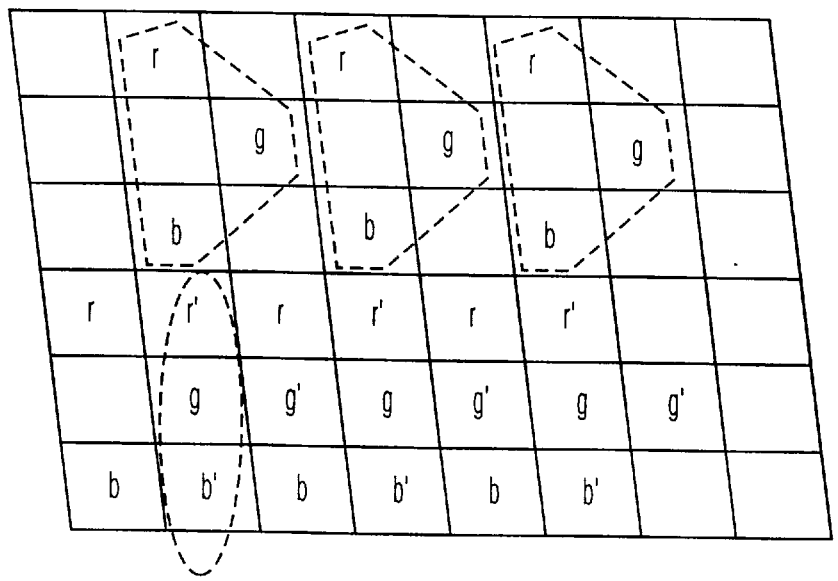
FIGS. 5B and 5C are diagrams corresponding to FIGS. 4A and 4B in the case of the embodiment of FIG. 5A.
Figure 5C:
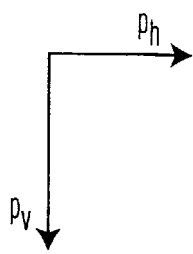

A simple approach to avoiding the above problems is to re-arrange the colour filter stripes such that they extend in the row, rather than column, direction. The shape and count of individual sub-pixels need not be changed. The display elements in one row of the array of the LC display panel then all display the same colour with three adjacent display element rows displaying R, G and B respectively, this colour sequence being repeated in successive groups of display element rows. A display panel with the colour pixels re-arranged in this manner is illustrated in FIG. 5A in the case of a 7-view system like that of FIG. 4A. FIG. 5B shows, for comparison with FIG. 4B, what a viewer perceives with one eye when in a position to see view "4". As can be seen, the row by row configuration of the colour filter provides full colour pixel triplets with a delta like configuration, and organised vertically, in the views. Three such colour pixel triplets in a row are indicated in dashed outline in the upper half of FIG. 5B. The horizontal and vertical pitches $P_h$ and $P_v$, indicated by FIG. 5C, are again 672 µm and 864 µm, giving a 343×200 resolution for each view. Because in this embodiment the triplets are of a delta configuration rather than elongate, the colour components of the R, G, B triplet are located closer together and form a tighter group. The individual pixels thus become less distinguishable and unwanted visible display artefacts in the form of diagonal colour stripes are reduced.

The appearance of the pixels in view "5" is indicated in the bottom half of FIG. 5B by the primed letters r', g' and b'. At positions where, due to optical cross-talk, both views are seen simultaneously by one eye, the colour pixel triplets will be made up by r, g, and b sub-pixels lying directly below each other in the column direction (one such triplet being indicated in dashed outline in the lower half of FIG. 5B) and the horizontal pitch is then effectively halved from 672 µm to 336 µm.

The situation for the other views obtained is similar.

The use of such a colour pixel layout in, for example, the six-view arrangement of FIG. 2 will have a generally similar effect in removing unwanted colour stripes.

A different way of re-arranging the colour filters to avoid the aforementioned problems with colour stripes is illustrated in FIG. 6, again using a 7-view system as example. In this embodiment, the display elements which either completely underlie, or at least whose greater portions underlie, a respective lenticule 16 are made all of the same colour and three adjacent lenticules are associated with elements of respective different colours, (R, G and B), the pattern being repeated for other groups across the array. Thus, each row of display elements consists of a series of groups of adjacent display elements of the same colour, the number in each group alternating between 3 and 4 in this case where 7 views are obtained, with the number of elements in 2 adjacent groups corresponding to the number of views. FIG. 6B shows the colour pixels seen by the eye of a viewer when in a position to see view "4" for comparison with both FIG. 4B and FIG. 5B. As in FIG. 5B, delta shaped colour triplets are produced but in this case the delta shape triplets appearing in view "4" are rotated compared with those of FIG. 5B and the triplets are now organised horizontally rather than vertically and with adjacent triplets in the row direction being inverted with respect to one another. Four such triplets are indicated in dashed outline in FIG. 6B. Also as in FIG. 5B, the appearance of the pixels in view "5" are indicated in the lower half of the Figure by r', g' and b'.

The horizontal and vertical pitches of the colour triplets in this embodiment are 1008 µm and 576 µm respectively, and the view resolution is 228 (horizontal) by 300 (vertical). At the cross-talk positions, for example between views 4 and 5, the vertical pitch is halved to 288 µm.

As in the previous embodiment, then because the triplets are of delta configuration with their colour components forming a tighter group, individual pixels become less distinguishable and the visibility of colour stripes in the display is reduced.

In halving the pitch of the colour triplets at positions where, due to cross-talk, the eye sees two views simultaneously, as in the case of the embodiments of FIGS. 5A and 5B and FIGS. 6A and 6B, then by virtue of the colour filters being appropriately arranged such that the colour triplets in adjacent views are made to interlock at those positions, the visibility of the R, G, B colour components individually is further reduced so that the problem of colour stripes appearing to a viewer which run diagonally or horizontally across the display is further alleviated.

Figure 6A:
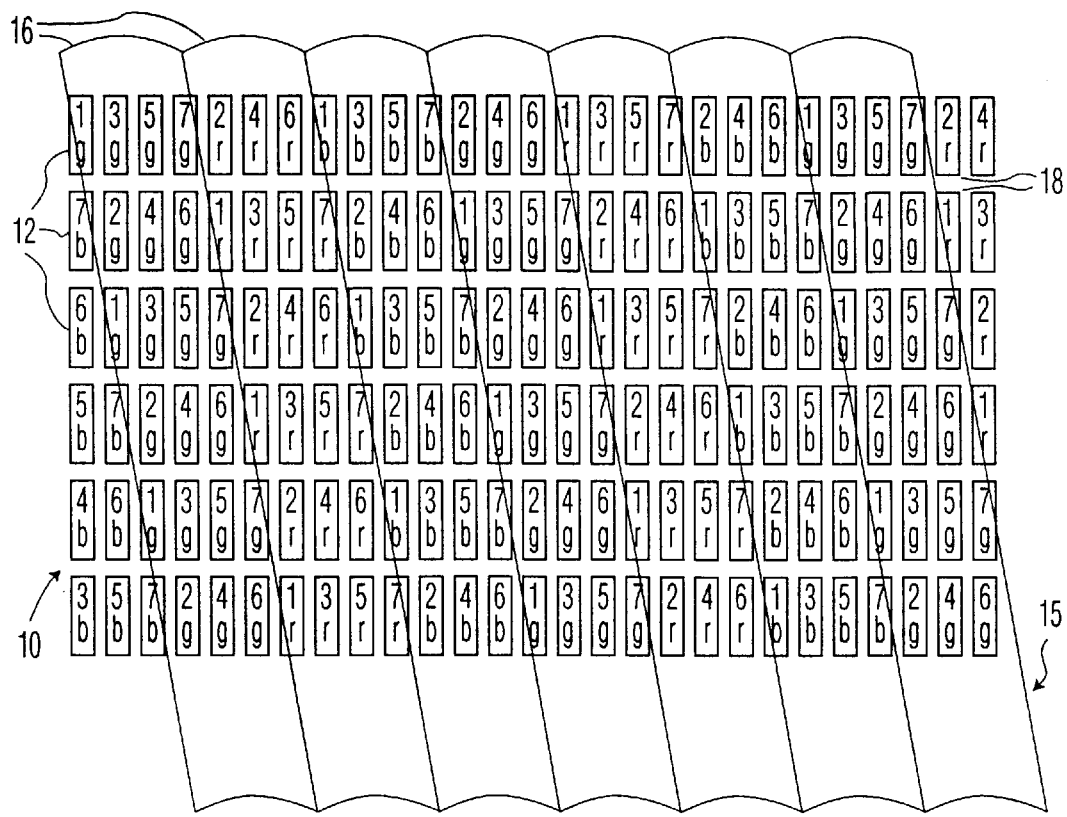
FIG. 6A illustrates the display element—lenticular element relationship in a further embodiment of a full colour display apparatus.
Figure 6B:
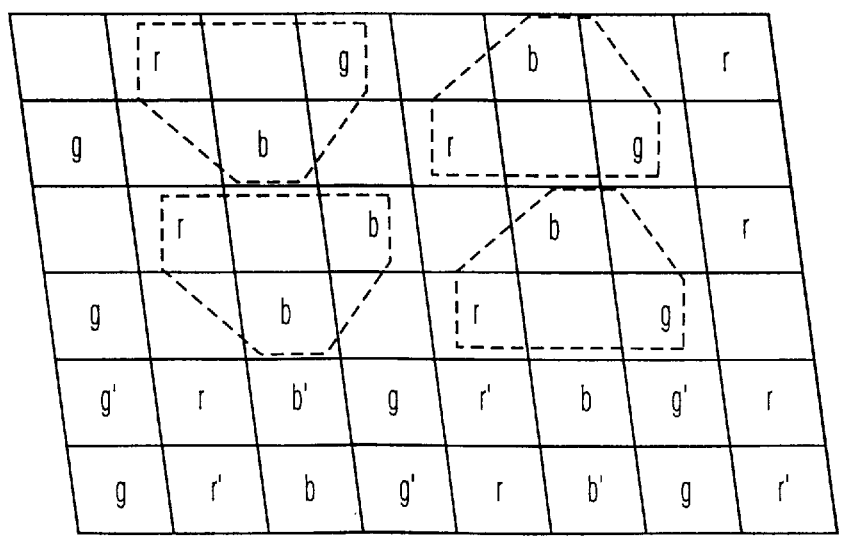
FIG. 6B shows an example of the colour pixels visible to a viewer's eye in the embodiment of FIG. 6A for comparison with FIGS. 4B and 5B.

A further advantage of suitably arranging the colour filters in the manners shown in FIGS. 5A and 6A is that the re-arrangements are implemented in a way in which the red, green and blue sub-elements in the LC display panel are arranged together in groups. If larger spacings are provided between adjacent groups, this grouping allows a relaxation of the alignment accuracy between the black mask used in the LC display panel and the colour filter array which offers better manufacturing yields, without decreasing the aperture of individual display (sub-)elements.

While the matrix display panel in the above described embodiments comprises an LC display panel, it is envisaged that other kinds of electro-optical spatial light modulators and flat panel display devices, such as electroluminescent or plasma display panels, could be used.

Also, while the lenticular elements associated with the display elements are in the form of a lenticular sheet, it is envisaged that they could be provided in other ways. For example, the elements could be formed in the glass plate of the display panel itself.

Figure 7:
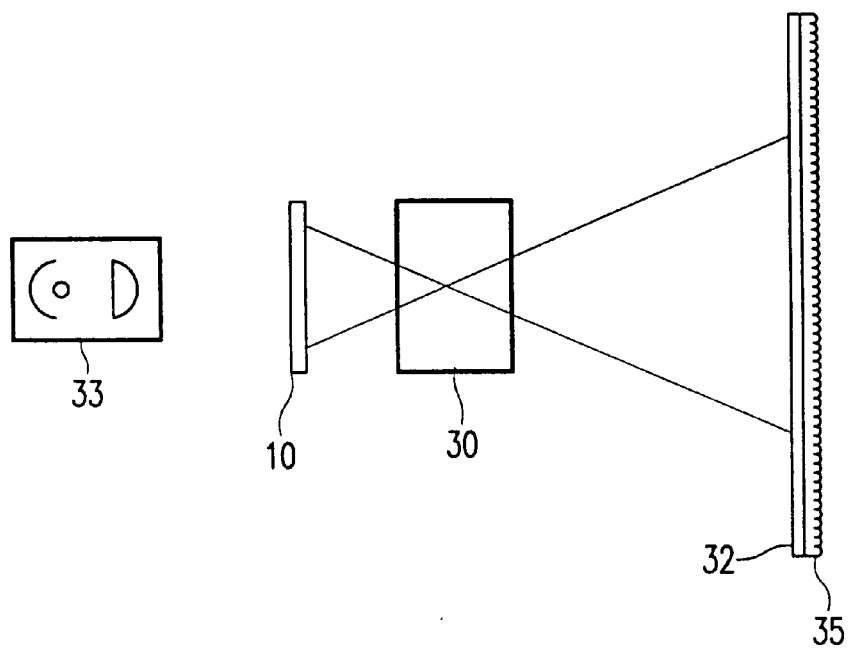
FIG. 7 is a schematic plan view of another embodiment of the invention providing a projected display.

The above-described embodiments provide direct-view displays. However, the autostereoscopic display apparatus may instead comprise a projection display apparatus. An embodiment of such apparatus, comprising a rear-projection apparatus, is shown in FIG. 7. In this apparatus, a generated image is projected by means of a projection lens 30 onto the rear of a diffuser projection screen 32. Over the front side of the screen 32, i.e. the side which a viewer faces, a lenticular sheet 35, comprising an array of parallel, elongate, lenticular elements, is disposed. The image projected onto the screen is generated in this example by a matrix LC display panel 10 similar to that described previously which is illuminated with light from a light source 33 via a condenser lens. The projection lens projects images of the display elements of the display panel 10 onto the screen 32 so that a magnified image of the row and column display element array composed of display pixels comprising enlarged images of the display elements in a corresponding array is produced on the screen. This display image consisting of display pixels, each constituted by a projected image of a display element, is viewed through the lenticular sheet 35. The lenticular elements of the lenticular sheet 35 are arranged with respect to the display pixels, i.e. the images of the display elements, on the screen as described previously, for example as shown in FIGS. 2 and 3, in slanting relationship with the columns of display element images on the screen, the rectangular blocks in FIGS. 2 and 3 now representing, of course, the images of the display elements at the screen.

Display devices other than an LC display panel, for example, a CRT, could be used instead to provide the projected display image comprising rows and columns of display pixels on the screen.

In summary, therefore, there has been described an autostereoscopic display apparatus comprising means for producing a display consisting of display pixels in rows and columns, for example, an LC matrix display panel having a row and column array of display elements, and an array of parallel lenticular elements overlying the display, in which the lenticular elements are slanted with respect to the display pixel columns. The reduction in display resolution experienced in such apparatus, particularly in the case of a multi-view type display, is then shared between both horizontal and vertical resolution.

From reading the present disclosure, other modifications will be apparent to persons skilled in the art. Such modifications may involve other features which are already known in the field of autostereoscopic display apparatus and component parts thereof and which may be used instead of or in addition to features already described herein.

We claim:

1. An autosteroscopic display apparatus comprising means for producing a display which comprises an array of display pixels arranged in rows and columns, and an array of elongate lenticular elements extending parallel to one another overlying the display pixel array and through which the display pixels are viewed, the lenticular elements being slanted at an angle to the display pixel columns so as to create repeating groups of display pixels each of which groups is constituted by adjacent pixels in r adjacent rows where r is a number greater than one and the angle of slant of the lenticular elements being substantially equal to $\tan^{-1} H_p/(V_p.r)$ where $H_p$ and $V_p$ are the pitches of the display pixels in the row and column direction respectively.

2. An autosteroscopic display apparatus according to claim 1, characterised in that the means for producing the display comprises a matrix display panel having an array of display elements arranged in rows and columns and each of which produces a said display pixel.

3. An autosteroscopic display apparatus according to claim 2, characterised in that the array of lenticular elements is disposed over the output side of the display panel.

4. An autosteroscopic display apparatus according to claim 2, characterised in that the apparatus includes a projection lens for projecting the images of the display elements onto a display screen to produce said display pixels and in that the array of lenticular elements is disposed over the viewing side of the display screen.

5. An autosteroscopic display apparatus according to claim 2, characterised in that the display elements of the display panel comprise liquid crystal display elements.

6. An autosteroscopic display apparatus according to claim 1, characterised in that the number r is equal to 2.

7. An autosteroscopic display apparatus according to claim 1, characterised in that the pitch of the lenticular elements is at least 1½ times the pitch of the display pixels in the row direction.

8. An autosteroscopic display apparatus according to claim 7, characterised in that the pitch of the lenticular elements is 2½ times the pitch of the display pixels in the row direction.

9. An autosteroscopic display apparatus according to claim 7, characterised in that the pitch of the lenticular elements is 3½ times the pitch of the display pixels in the row direction.

10. An autosteroscopic display apparatus according to claim 1, characterised in that the lenticular elements have a cross-section which is part of a circle.

11. An autosteroscopic display apparatus according to claim 1 characterised in that the apparatus is a colour display apparatus in which different display pixels are of different colours.

12. An autosteroscopic display apparatus according to claim 11, characterised in that the colour display pixels of the array are arranged so as to produce colour pixel triplets, each comprising a red, green and blue display pixel, having a delta configuration.

13. An autosteroscopic display apparatus according to claim 11, characterised in that the display pixels in a row are of the same colour and three adjacent rows of display pixels each display a respective and different one of the three primary colours.

14. An autosteroscopic display apparatus according to claim 13, characterised in that the sequence of the colours of the three adjacent rows of pixels is repeated in all rows of pixels in the array.

15. An autosteroscopic display apparatus according to claim 11, characterised in that the display pixels underlying, at least to a substantial extent, a respective lenticular element are of the same colour and the display pixels associated with each of three adjacent lenticular elements are of a respective and different one of the three primary colours.

16. An autosteroscopic display apparatus according to claim 15, characterised in that the sequence of colours associated with the three adjacent lenticular elements is repeated for all lenticular elements over the display pixel array.

17. An autosteroscopic display apparatus according to claim 11, characterised in that the means for producing the display comprises a colour LC matrix display panel having a row and column array of display elements and an array of colour filter elements associated with the display element array.

18. An autostereoscopic display apparatus comprising means for producing a display which comprises an array of display pixels arranged in rows and columns, and an array of elongated lenticular elements extending parallel to one another overlying the display pixel array and through which the display pixels are viewed, the lenticular elements acting as optical director means to provide separate images to a viewer's eyes to thereby provide an autostereoscopic display to the viewer, the lenticular elements being slanted at an angle to the display pixel columns and having a pitch greater than the pitch Hp of the display pixels in the row direction.

19. An autostereoscopic display apparatus according to claim 18, wherein the pitch of the lenticular elements is at least 1½ times the pitch of the display pixels in the row direction.

20. An autostereoscopic display apparatus according to claim 19, wherein the pitch of the lenticular elements is from about 2½–3½ times the pitch of the display pixels in the row direction.

* * * * *